Patented Aug. 16, 1932

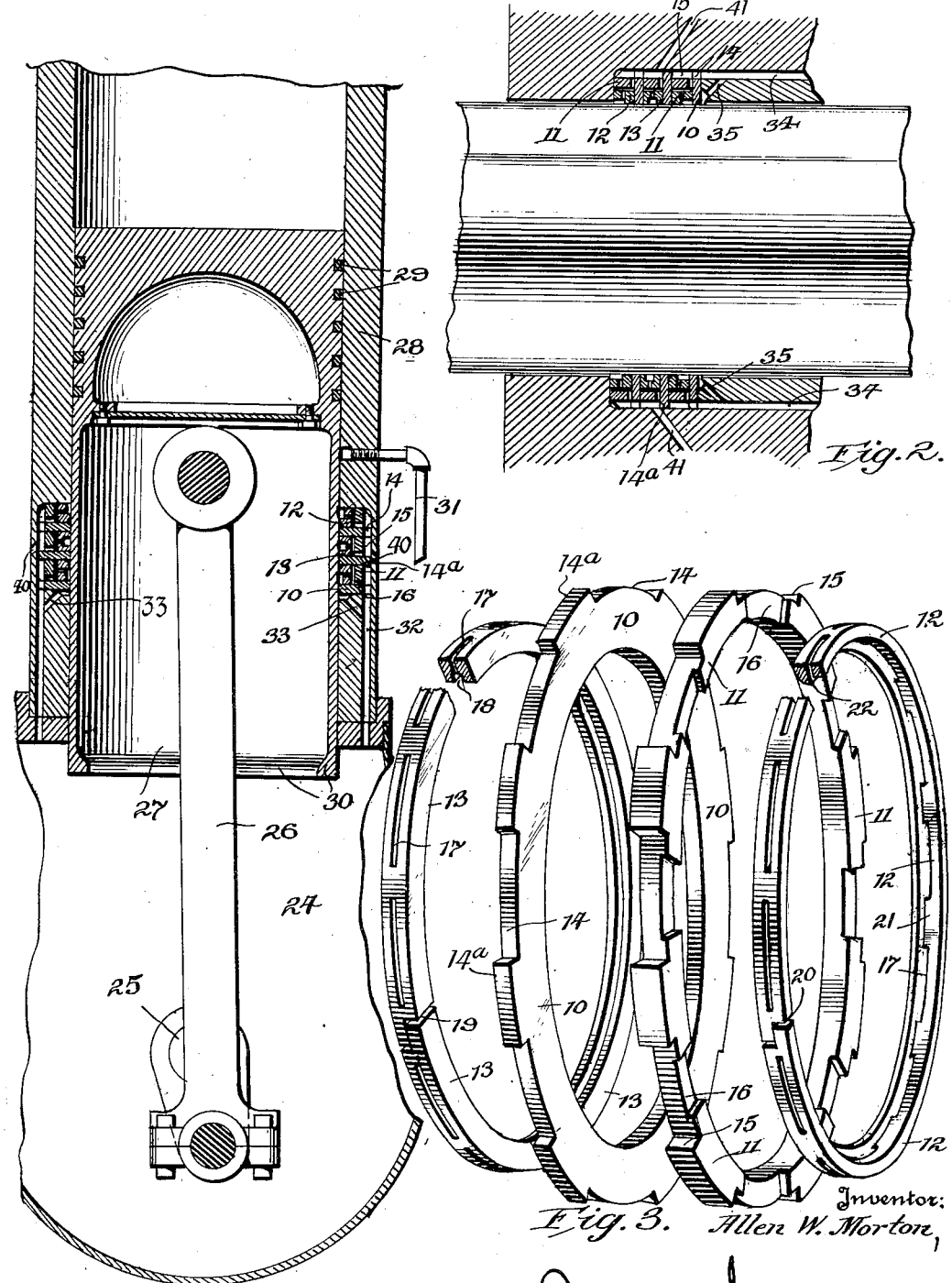

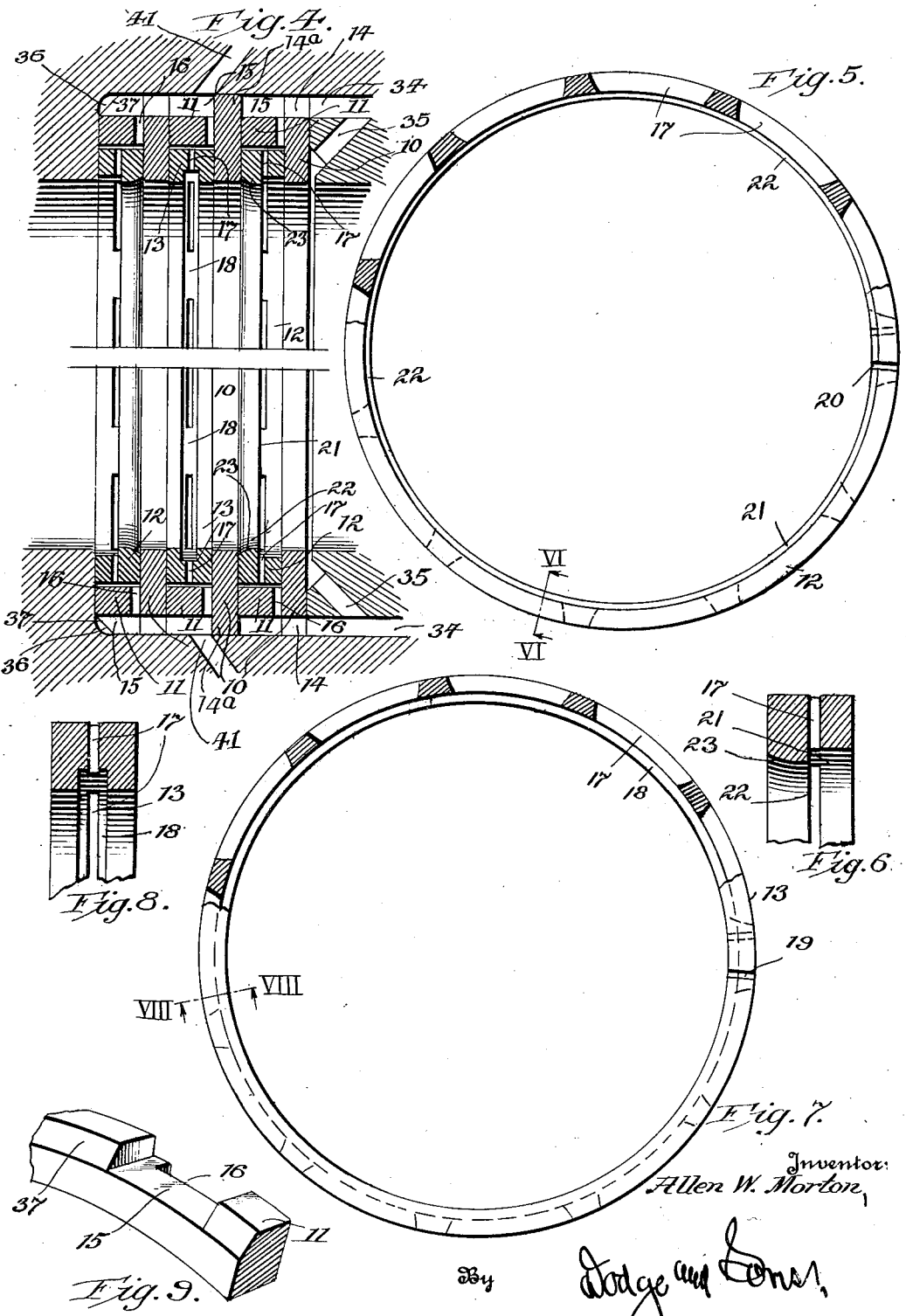

1,871,820

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PACKING

Application filed September 13, 1930. Serial No. 481,781.

This invention relates to packings and particularly to metallic packings made up of a plurality of separate rings. Packings embodying my invention are well adapted for use in engines in which the piston rings are placed in grooves in the cylinder wall and cooperate with the piston, but are equally applicable for use as rod packings.

One relation in which this packing is particularly valuable is in constructions where different kinds of oil are used on opposite sides of the packing so that it is desirable, or necessary, to prevent the two portions of oil from intermingling.

One of the salient features of the invention resides in the use of a contracting slotted ring having an interior annular groove extending entirely around it and connecting the slots. The contracting ring is preferably hammered at unequally spaced intervals on the outside to cause it to engage a piston or piston rod with uniform tension throughout its circumference. For facility of manufacture the slots are cut from the outside of the ring, in all sizes of rings, it being impracticable to cut them from the inside in rings of small size.

Among the other advantageous features of packings embodying my invention, may be mentioned the provision of a packing which can be made of any desired axial extent by the assembly of different numbers of standard rings; the assurance that the packing will tightly seal the rod or piston with which it contacts until the rings of which it is composed become so worn that the effective projections on them are substantially removed; and a packing from which the oil on the associated rod or piston may drain away readily so as to prevent an excessive accumulation.

Other advantageous features of this invention will appear from the following description when read in connection with the accompanying drawings in which:—

Figure 1 is a sectional view of one form of packing embodying my invention shown as applied to an internal combustion engine of the vertical type, and in which a long trunk type piston is used, Fig. 2 is a sectional view of the same embodiment applied to a rod packing, Fig. 3 is a perspective view of the various rings employed in this packing, Fig. 4 is an enlarged view similar to Fig. 2, with the piston rod omitted, Fig. 5 is a side view of one of the slotted oil-control contracting rings, partly in section to show the position of the slots, Fig. 6 is a section on line VI—VI of Fig. 5, showing the oil-scraping surface in detail, Fig. 7 is a side view of another slotted oil-control contracting ring, with a portion in section to show the location of the radial slots, Fig. 8 is a section on line VIII—VIII of Fig. 7, showing the internal groove of a contracting oil-control ring, and Fig. 9 is a perspective view of a portion of one of the spacer rings showing how it may be beveled to provide an oil channel at one end of the packing groove and to prevent wedging at or in the corner.

Similar reference characters refer to similar parts in each of the several views.

As shown in Fig. 4 this packing is made up of a plurality of separator rings 10, spacer rings 11, contracting oil-control rings 12 and a slotted contracting ring 13. Each separator ring 10 is of annular form and has a series of evenly spaced peripheral slots 14 in its outer edge between the outwardly projecting lugs 14a. Each spacer ring 11 is provided with peripheral slots 15 having substantially the same size and spacing as the slots 14 in ring 10. The spacer rings 11 also contain radial slots 16 in evenly spaced relation on one face, and placed in substantial coincidence with the slots 15.

It will be obvious that when a plurality of separator rings 10 and spacer rings 11 are assembled with their sides abutting, as shown in Fig. 4, the peripheral slots 14 and 15, when brought into line, will provide a number of axial channels between the outside of the packing and the inside wall of the packing groove. The slots 16 in rings 11 will also afford communication between these axial channels and the annular chambers formed by the adjacent separator rings 10 inside of the spacer rings.

As will be seen, the uppermost ring 11 through its beveled construction prevents wedging at the corner, as it is very difficult to machine a square corner without any fillet. Hence, by beveling the edge of the spacer ring, it is very easy to make the packing assembly fit properly.

Within each of the chambers formed by two adjacent separator rings and the spacer ring which holds them in spaced relation, is placed a slotted contracting ring 13 or a slotted oil-control ring 12, depending upon the particular function the packing is to perform. The slotted rings are of less axial thickness than the spacer rings so as to be freely movable in a radial direction and to be capable of adjusting themselves to the rod or piston which they embrace. As shown in Fig. 4, one of the chambers between the separator rings contains a contracting ring 13, while the other two chambers contain oil-control rings. This specific arrangement is adapted for a purpose which will be pointed out latter on.

Each ring 13 contains spaced radial slots 17 extending between the inner and outer surfaces of the ring, and connecting with an internal annular groove 18 in the ring. The slots 17 are preferably made by sawing through the ring from the outside inwardly, because such a process cannot be carried out from the inside outwardly in rings of smaller size, and uniform practice is desirable. The ring is split at 19 and, as here shown, is provided with an ordinary stepped joint, although this particular joint is not essential.

Oil-control rings 12 also contain spaced radial slots 17 and are provided with a joint 20 similar to the joint 19 in ring 13. Rings 12 contain an inside annular groove 21 with which the radial slots 17 communicate, but this groove is not centrally located in the ring and extends entirely to one edge of the ring. The opposite edge of this groove is, however, provided with an oil-scraping surface 22 terminating in a sharp edge adjacent to groove 21, and tapers outwardly from the edge adjacent to slots 17, toward the outer face of the ring as shown at 23. When one of the ring 12 is placed on a piston rod, as shown in Fig. 4 for example, and the rod moves from left to right, there will be no scraping action by the right hand ring and the oil can readily be carried through the ring, but when the rod returns, passing from right to left, the oil on the surface of the rod will be scraped away by the scraping edge 22 of the ring and prevented from passing beyond this edge. During the movement of the rod from left to right the left hand ring will scrape oil, but not on the return travel.

This packing is designed to exert uniform radial tension against the movable member which it embraces, and is intended to afford a means for distributing lubricant and allowing excess lubricant to escape from the moving member through the packing. Because of this latter feature it is necessary to provide the packing groove with oil-draining channels. One method of arranging these channels is shown in Fig. 1.

Referring now to Fig. 1, the reference character 24 designates the crank case of an internal combustion engine having a crank shaft 25, a connecting rod 26 and a long trunk piston 27. As is obvious, the piston 27, during rotation of crank shaft 25, moves up and down in the cylinder 28, the driving action being brought about by combustion of suitable fuel in the combustion chamber at the top of the cylinder. The details of this arrangement are not a part of this invention and will be understood without further explanation.

As here shown, the piston 27 is of the trunk type having adjacent its upper end a plurality of the usual snap rings 29, but extending in a smooth skirt downwardly to the bottom end where it is reinforced by a strengthening bead 30. The lower portion of the piston is sealed by a packing embodying my invention, and made up in substantially the same manner as the packing shown in Fig. 4. Lubricating oil is supplied to the surface of the piston 27 through pipe 31.

During the reciprocating travel of piston 27, the contracting rings 12 and 13 of the packing will maintain themselves in closely adjusted relation to the outer surface of this piston. Lubricating oil from the piston will be scraped off by the upper oil-control ring 12 as the piston moves downwardly and will run out through the slots in ring 12 into the chamber inside of spacer ring 11 and thence through the slots 16 in this ring to the axial channels formed by the peripheral slots in the spacer and separator rings, from whence it will be delivered to the upper part of channel 32 and return to the engine crank case or to any other reservoir. In similar manner the bottom oil-control ring 12 will prevent the oil on the bottom end of the piston, collected from the crank case chamber, from passing upwardly past the packing into the combustion chamber during upward movement of the piston, and this oil will pass through the slots in the lower oil-control ring and will return to the engine crank case through channel 32, and that which is scraped off by the lower separator ring will also return to channel 32 through channel 33. It will be obvious that if it is desired to prevent intermingling of two oils of different viscosities, the exit channel 32 may be suitably arranged to accomplish this purpose. This may be effected by blocking channel 32, the central separator ring 10 being made solid or without the peripheral slots 14 and by drilling exit holes 40 to drain the upper portion of channel 32 independent of the lower portion. Thus oil scraped by upper ring 12 and ring 13 will be removed through drains 40 and oil scraped by lower ring 12 and separator 10 will drain to channel 32.

The arrangement disclosed in Fig. 1 is suitable for Diesel engine use and is also well adapted for engines or compressors where the gas pressure on the rings is sufficient to collapse the ordinary types of ring which are carried by the piston. By placing the rings inside of the cylinder wall and using a plug piston, any difficulties of this nature are completely obviated.

The packing is shown in Fig. 2 as applied to a rod which may have a reciprocating travel. The function of this packing is similar to that of the packing already described, the oil collected by the left hand oil-control ring being delivered to a channel 34, and that collected by the right hand ring delivered to this channel and also the oil scraped by separator ring will pass through channel 35 to channel 34. These channels may be connected to any suitable reservoir arranged to prevent intermingling of oil on the two sides of the packing as described above, if such an arrangement is desired. For instance, central separator ring 10 may be made solid to block channel 34 and, by means of holes 41, oil collected by two left hand rings will be removed independently. The details of construction are more clearly indicated in Fig. 4.

It has been found advantageous in some cases to provide an annular passageway 36 at the left hand end of the packing groove (see Fig. 4), in order to afford communication between the various axial oil channels, other than through the radial slots and thus facilitate travel of the oil from one compartment to another. This passageway 36 is provided for by beveling the outer corner of spacer ring 11 at 37 as clearly shown in Fig. 9.

It will be understood, of course, that in use the packing will be subjected to considerable axial pressure as is usual, thereby holding separator rings 10 in rigid spaced relation through contact with the spacer rings.

Packings embodying my invention, as will appear from the above description, are of a construction well adapted for use in Diesel engines, or in other mechanisms wherein it is essential to securely seal the space around relatively moving parts. It is also of distinct advantage where oils of different kinds are used on opposite sides of the packing and where it is desired to prevent oil from one chamber entering the other chamber through the medium of a rod reciprocating through the packing.

Not only is this packing suitable for the use mentioned above, but it is unusually well adapted for use as an ordinary rod packing. The hammered contracting rings have absolutely uniform tension throughout their circumference, so as to accurately contact with the surface of a rod throughout the normal life of the packing. So far as I am aware I am the first to employ a packing of this type embodying a radially slotted ring having an internal annular groove connecting the slots so as to facilitate oil circulation and to keep the packing rings thoroughly lubricated at all times. Such a construction not only reduces wear, but also enables the rings to adjust themselves to the moving parts freely under all conditions. The sealing action is also greatly improved by hammering the ring on the outer face at such intervals that it exerts uniform radial inward tension throughout its circumference.

Although I have herein shown and described only one form of packing embodying my invention, it will be obvious that changes may be made in the details, such as varying the number and arrangement of the oil-control rings, within the scope of the appended claims, without departing from the spirit and scope of my invention.

What is claimed is:—

1. A rod packing comprising a plurality of separator rings having spaced peripheral slots in their outer faces; a spacer ring between each pair of separator rings and defining an annular chamber between said separator rings, the outer faces of the spacer rings containing spaced peripheral slots adapted to cooperate with the peripheral slots in the separator rings to form axial channels when the packing is assembled, and the spacer rings containing radial slots in one flat face to connect the axial channels with the annular chambers; and a radially slotted contracting ring in each of said annular chambers, each contracting ring having an annular groove in its inside face and connected with said slots.

2. A rod packing comprising a plurality of separator rings held in spaced relation to form three annular chambers; a radially slotted contracting ring in the middle chamber, said contracting ring having an annular groove in its inside face and connecting said slots; and a radially slotted contracting oil-control ring in each of the remaining annular chambers, said oil-control rings being formed with means contacting with the rod and so placed with reference to each other as to work in opposition and to prevent oil from passing axially through said packing.

3. A rod packing comprising a plurality of separator rings held in spaced relation to form three annular chambers; a radially slotted contracting ring in the middle chamber, said contracting ring having an annular groove in its inside face and connecting said slots; a radially slotted contracting oil-control ring in each of the remaining annular chambers; and means for removing oil from said packing and preventing the intermingling of oil from the two sides of the packing.

4. A rod packing comprising a plurality of separator rings held in spaced relation to form a plurality of annular chambers; a radially slotted contracting ring in one of said chambers, said contracting ring having an annular groove in its inside face and connecting said slots; a radially slotted contracting oil-control ring in at least one of the remaining annular chambers; and means for removing oil from said packing and preventing the intermingling of oil from the two sides of the packing.

5. The combination with a reciprocable rod of a rod packing comprising a plurality of separator rings held in spaced relation to form a plurality of annular chambers; a radially slotted contracting ring in each of said chambers, said contracting rings each having a groove in its inside face connecting certain of said slots; and rod-contacting means adapted to scrape oil from the rod, said means being constructed and arranged to prevent oil from passing axially of the rod from one end of the packing to the other.

6. A metallic packing comprising a plurality of separator rings; spacer rings for holding said separator rings in spaced relation to form a plurality of annular chambers; radially slotted one-piece split contracting rings in certain of said chambers, each of said contracting rings having an annular groove in its inside face connecting said slots; and means for draining oil collected in said slots radially to the annular chambers, and thence from said chambers through the spacer rings.

In testimony whereof I have signed my name to this specification.

ALLEN W. MORTON.